(12) United States Patent
Boytim et al.

(10) Patent No.: US 6,744,987 B1
(45) Date of Patent: Jun. 1, 2004

(54) TERTIARY OPTICAL MEDIA INTERFACE

(75) Inventors: Mathew Alan Boytim, Kokomo, IN (US); Russell Wilbur Pogue, Jr., Greentown, IN (US)

(73) Assignee: Delphi Technologies, Inc, Troy, MI (US)

( * ) Notice: Subject to any disclaimer, the term of this patent is extended or adjusted under 35 U.S.C. 154(b) by 0 days.

(21) Appl. No.: 09/550,956

(22) Filed: Apr. 17, 2000

(51) Int. Cl.[7] .............................................. H04J 14/08
(52) U.S. Cl. .......................... 398/98; 398/100; 398/61; 398/63; 398/91; 398/75; 398/182; 398/202; 398/191; 398/66; 398/67
(58) Field of Search .............................. 398/98, 63, 61, 398/91, 100, 75, 182, 202, 191, 66, 67

(56) References Cited

U.S. PATENT DOCUMENTS

| 5,452,115 | A | * | 9/1995 | Tomioka | 359/123 |
| 5,995,512 | A | | 11/1999 | Pogue, Jr. | 370/419 |
| 6,115,163 | A | * | 9/2000 | Nobuhara | 359/189 |
| 6,151,150 | A | * | 11/2000 | Kikuchi | 359/194 |
| 6,169,619 | B1 | * | 1/2001 | Ide | 359/189 |
| 6,229,634 | B1 | * | 5/2001 | Smith et al. | 359/191 |
| 6,310,707 | B1 | * | 10/2001 | Kawase et al. | 359/156 |
| 6,310,708 | B1 | * | 10/2001 | Ota et al. | 359/181 |

* cited by examiner

*Primary Examiner*—Leslie Pascal
*Assistant Examiner*—Hanh Phan
(74) *Attorney, Agent, or Firm*—Jimmy L Funke

(57) ABSTRACT

An optical superposition network that utilizes a time division multiplexing (TDM) protocol includes a first optical transmitter, a second optical transmitter and a receiver. The first optical transmitter transmits information in a tertiary mode during a time slot. The second optical transmitter transmits information in a tertiary mode during a different time slot. The information transmitted across the optical superposition network has an approximately constant average intensity such that the receiver can utilize a single decision threshold for the information received from the first and second optical transmitters.

32 Claims, 11 Drawing Sheets

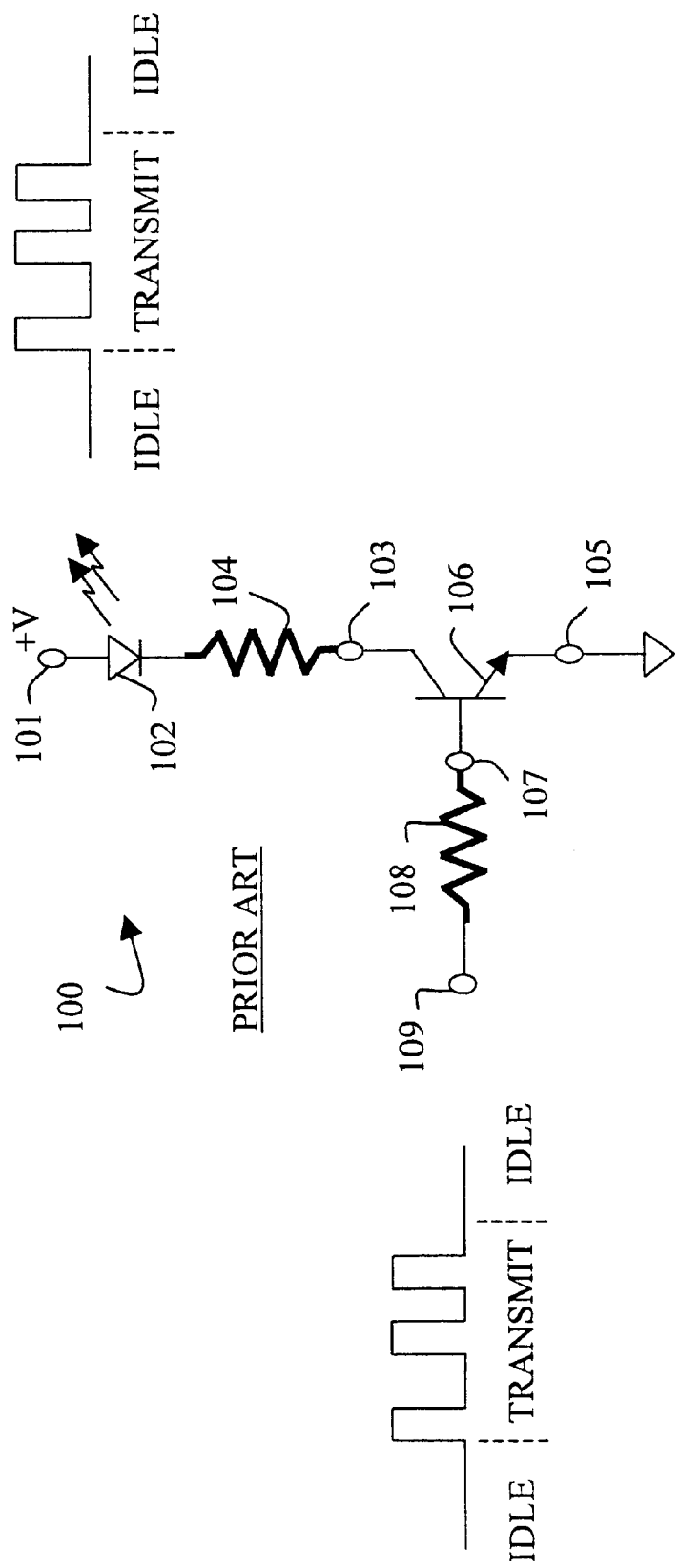

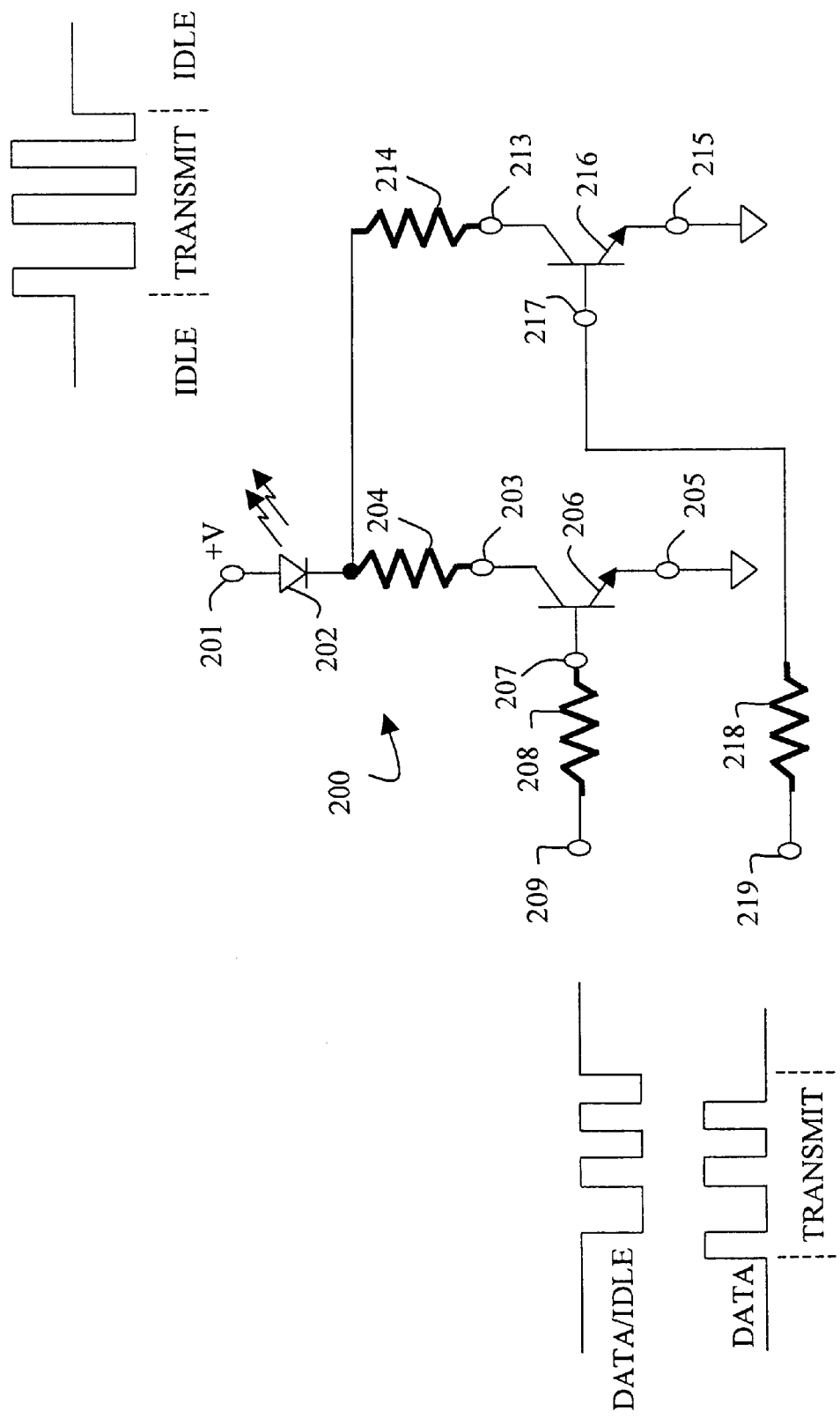

TERTIARY OPTICAL MEDIA INTERFACE

BACKGROUND OF THE INVENTION

The present invention is directed to an interface for coupling a transmitter to an optical fiber, and more specifically to a tertiary optical media interface for providing information to an optical superposition network that utilizes a time division multiplexing (TDM) protocol.

As is well known to one of ordinary skill in the art, a superposition network includes any network in which various signals combine additively on a network media. The TDM protocol, which has been widely utilized with various networks that share a common communication path (e.g., Ethernet), is also well known to one of ordinary skill in the art. In a network that implements a TDM protocol, all nodes wishing to communicate over the network take turns such that only one node transmits at a time. This has typically been accomplished with either a collision avoidance scheme (i.e., where a frame is assigned a unit of time, which is divided into time slots with each node being assigned a time slot or slots within which to transmit in each frame) or a collision resolution scheme (e.g., carrier sense multiple access/collision detection (CSMA/CD)). Some electrical networks that have utilized a TDM protocol have also used tertiary signaling for communication.

In a network that implements a TDM protocol, each receiver may receive data from multiple transmitters. This data is a time interleave of the transmitted signals from the multiple transmitters. Due to the variation in transmitter power and path attenuation, the time multiplexed signals produced by the multiple transmitters frequently have different amplitudes at a given receiver. As a result, each receiver coupled to such a network has been required to include the capability of compensating for the signal variation.

In electrical networks, when the low frequency properties of a received signal are known (or controlled through, for example, coding), an appropriate threshold can be derived from the received signal (by low pass filtering the received signal). For example, bi-phase coding (where each bit of data is represented by two bits) provides a threshold, which is midway between a minimum and a maximum of a signal. While bi-phase coding is desirable for clock synchronization, it undesirably reduces the network bandwidth by approximately one-half. In the situation where the appropriate threshold is the average of the maximum and the minimum signal levels, an AC coupled receiver (referenced to a common ground) can be utilized without signal distortion. While utilizing such a receiver in an optical superposition network, which utilizes binary signaling with varying received amplitudes, yields received signals that have a constant base line (the common ground), the received signals may have a non-constant center line (desired threshold).

One approach to resolving the problem of a non-constant center line (threshold) has been to use a receiver with an adaptive threshold. One technique has tracked a minimum and a maximum level of a received signal and set a threshold midway between the two. Unfortunately, this technique is susceptible to noise. Another technique has adjusted the threshold for each transmitter. However, this technique requires a transmission preamble from which the threshold can be determined, which undesirably reduces the bandwidth of the network.

Optical networks, currently in use, have primarily utilized a multiple point-to-point topology. In optical networks that use a point-to-point topology, each node typically includes a different receiver for each node from which it receives signals. As such, a threshold of each different receiver can be individually adjusted to compensate for the received signal amplitude. Another topology that has seen limited use in optical networks is the star topology. The optical star topology includes a central hub and a number of nodes, which communicate through the hub via optical fibers. In a passive optical star network, the hub functions to combine and then split the light signals it receives. In a passive optical star network, a receiver within a single node may be coupled to multiple transmitters that provide signals of different intensities.

In current optical networks, the optical transmitting device (e.g., light emitting diode (LED)) has been a binary element. That is, the LED has either been on or off. At the receiver, the received signal has been compared to a threshold, which has been set between a light level and a dark level. Above the threshold, the received signal is considered light or a digital "1". Below the threshold, the received signal is considered dark or a digital "0". However, because the intensity of the received signal may not be known in advance, the threshold has not typically been fixed. That is, the threshold has been a function of the received signal intensity. As such, optical networks that include receivers that are coupled to multiple transmitters (that may provide signals of varying intensities) have been required to include the capability of compensating for this received signal variation.

Thus, the development of a technique which allows multiple transmitters coupled to an optical superposition network to provide signals that have an approximately constant average intensity (threshold) is desirable.

SUMMARY OF THE INVENTION

The present invention is directed to a technique for electronically transmitting information across an optical superposition network that utilizes a time division multiplexing (TDM) protocol. In such a network, a first optical transmitter, a second optical transmitter and a receiver are coupled to an optical fiber. The first transmitter transmits information in a tertiary mode during a time slot. The second transmitter transmits information in a tertiary mode during a different time slot. The information transmitted across the optical fiber has an approximately constant average intensity such that the receiver can utilize a single decision threshold for the information received from both the first and second optical transmitters.

These and other features, advantages and objects of the present invention will be further understood and appreciated by those skilled in the art by reference to the following specification, claims, and appended drawings.

BRIEF DESCRIPTION OF THE DRAWINGS

The present invention will now be described, by way of example, with reference to the accompanying drawings, in which:

FIGS. 1A–1C are electrical circuit diagrams of prior art binary LED drivers;

FIGS. 2A–2C are electrical circuit diagrams of tertiary LED drivers, according to various embodiments of the present invention;

DESCRIPTION OF THE PREFERRED EMBODIMENTS

Figure 1B:
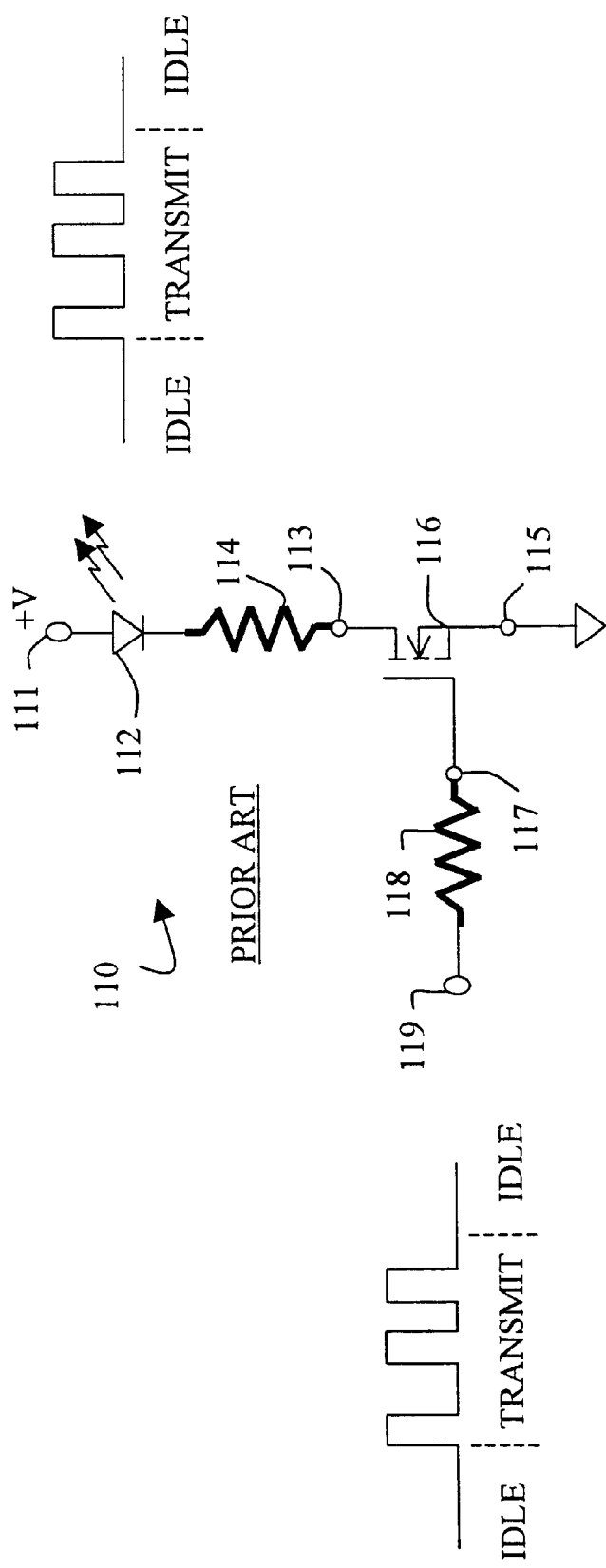

Providing an intermediate optical level (quiescent state), by coding the transmitted electrical signal to be substantially DC free, allows a given receiver to use the same decision threshold for signals transmitted from different nodes of an optical superposition network. The threshold is the mean of the composite signal and is coded so as to not vary appreciably. This technique provides inherent robustness as a corresponding decision threshold is shifted when a transmitter is stuck on, off or fails to transmit during a particular time slot or when a time slot is unassigned. Utilizing an explicit quiescent state and coding the transmitted signal to be substantially DC free allows conventional AC coupled electrical media to be utilized at each receiver.

FIG. 1A illustrates a typical prior art binary light emitting diode (LED) driver 100. An anode of an LED 102 is coupled to a positive terminal (+V) of a power supply at terminal 101. A cathode of LED 102 is coupled to a first terminal of a resistor 104. A second terminal of resistor 104 is coupled to a collector (terminal 103) of an NPN transistor 106. An emitter (terminal 105) of transistor 106 is coupled to a common ground. A resistor 108 is coupled between a base (terminal 107) of transistor 106 and a terminal 109. Resistor 108 serves to limit a base current of transistor 106. During normal operation, a data signal is applied to terminal 109. The data signal is of a sufficient level to cause transistor 106 to switch (on and off) as a function of the data signal at terminal 109. When transistor 106 turns on, current is conducted through LED 102, resistor 104 and transistor 106. This causes LED 102 to emit light. The intensity of the light is a function of the current (controlled by the data signal at terminal 109) that is conducted through LED 102.

FIG. 1B is an electrical schematic of a binary LED driver 110 that utilizes an N-channel enhancement mode field-effect transistor (FET) 116. Similar to FIG. 1A, a data signal of a sufficient level at a terminal 119 causes a LED 112 to conduct current. Current conducted through LED 112 causes light to be emitted from LED 112. The emitted light corresponds in intensity to the data signal at terminal 119. As shown in FIG. 1B, an anode of LED 112 is coupled to a positive terminal (+V) of a power supply at a terminal 111. A cathode of LED 112 is coupled to a first terminal of a resistor 114. A second terminal of resistor 114 is coupled to a drain (terminal 113) of FET 116. A source (terminal 115) of FET 116 is coupled to a common ground. A resistor 118 is coupled between terminal 119 and a gate (terminal 117) of FET 116 and acts to limit a gate current of FET 116. Resistor 114 acts to limit the current through LED 112 and FET 116 when FET 116 is turned on.

Figure 1C:
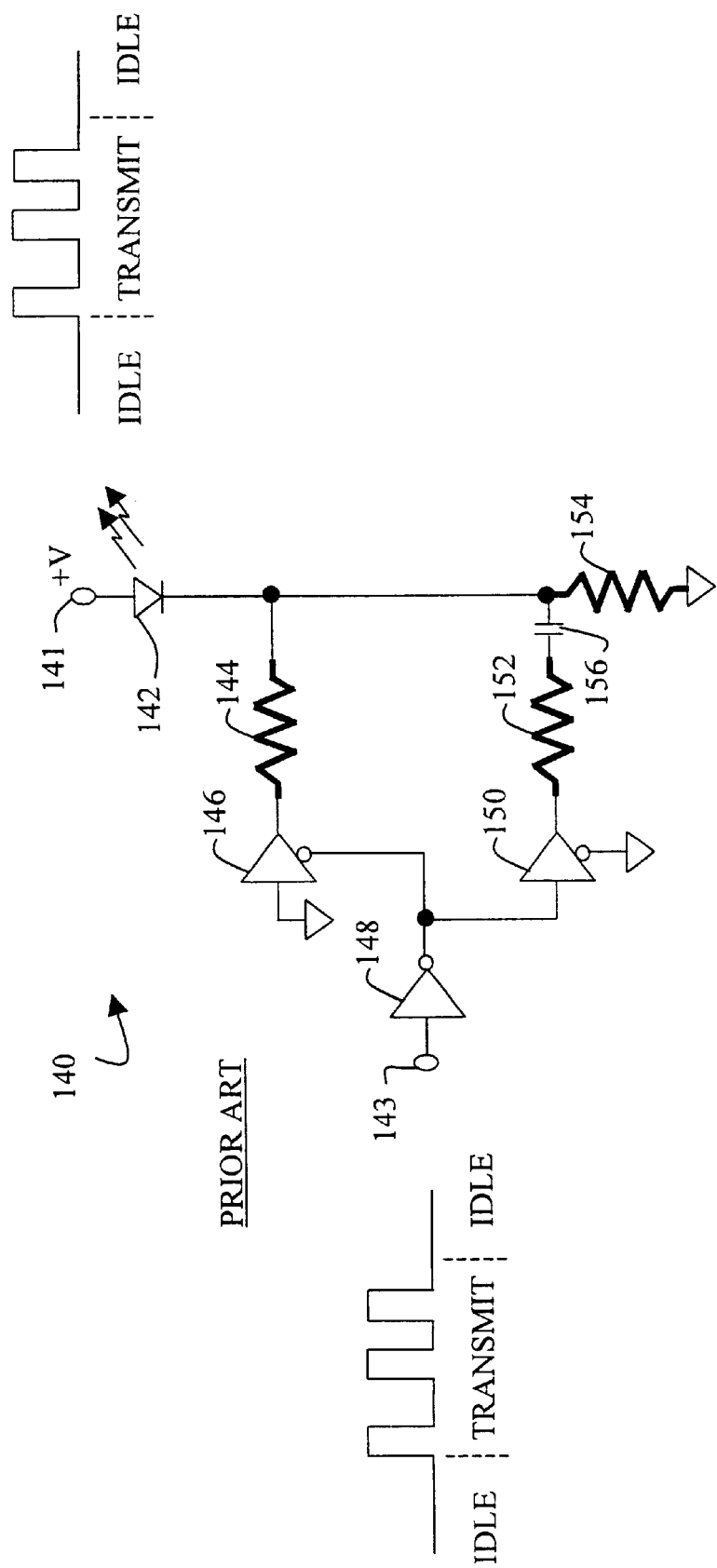

FIG. 1C is an electrical schematic of a binary LED driver 140. An anode of an LED 142 is coupled to a positive terminal (+V) of a power supply at terminal 141. A cathode of LED 142 is coupled to a first terminal of a resistor 144, a resistor 154 and a capacitor 156. Resistor 154 sets a pre-bias current for LED 142. This pre-bias current positions LED 142 near its linear region of operation. The pre-bias current functions to partially turn LED 142 on such that an input signal applied at terminal 143 will cause LED 142 to operate in a substantially linear region. A second terminal of resistor 144 is coupled to an output of a buffer 146. An input of buffer 146 is coupled to a common ground. An enable input of buffer 146 is coupled to an output of inverter 148. The output of inverter 148 is also coupled to an input of buffer 150. An enable input of buffer 150 is coupled to ground. An output of buffer 150 is coupled to a first terminal of a resistor 152. A second terminal of resistor 152 is coupled to a second terminal of capacitor 156.

A data signal (when asserted) at terminal 143 causes LED 142 to conduct, through resistor 144 and buffer 146. The data signal causes LED 142 to shut-off when the data signal is deasserted. The light emitted from LED 142 tracks the data signal at terminal 143. Buffer 150, resistor 152 and capacitor 156 (collectively known as a peaking circuit) carry a transient current when the data signal causes LED 142 to switch from a non-conducting state to a conducting state or from a conducting state to a non-conducting state. This improves the transient response of LED 142. Thus, the LED's of FIGS. 1A–1C emit light when a data signal is asserted and are off when the data signal is deasserted.

Figure 1D:
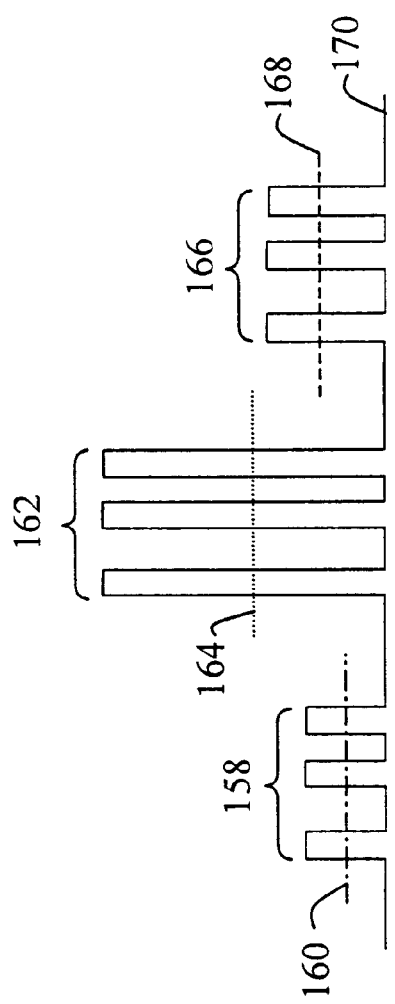
FIG. 1D is an example of signals provided by multiple transmitters (such as those of FIGS. 1A–1C) at a single receiver.

FIG. 1D is an example of signals provided by multiple transmitters (such as those of FIGS. 1A–1C) at a single receiver. A transmitted signal 158, from a first transmitter, has a center line 160. A transmitted signal 162, from a second transmitter, has a center line 164. A transmitted signal 166, from a third transmitter, has a center line 168. As shown, signals 158, 162 and 166 have a constant baseline 170. However, signals 158, 162 and 166 have different center lines 160, 164 and 168, respectively. As discussed above, a single receiver that receives signals that have a non-constant center line must adaptively adjust a decision threshold.

FIG. 2A is an electrical schematic of a tertiary LED driver 200, according to an embodiment of the present invention. An anode of LED 202 is coupled to a positive terminal (+V) of a power supply at a terminal 201. When either a transistor 206 or a transistor 216 (or both) are turned on, LED 202 conducts current and emits light. During normal operation, a data/idle signal is applied to terminal 209. The data/idle signal tracks a data signal when the data signal is present and returns to an asserted state when the data signal is not present. A cathode of LED 202 is coupled to a first terminal of a resistor 204 and a resistor 214. A second terminal of resistor 204 is coupled to a collector (terminal 203) of transistor 206. An emitter (terminal 205) of transistor 206 is coupled to a common ground. A resistor 208 is coupled between a base (terminal 207) of transistor 206 and a terminal 209.

A second terminal of resistor 214 is coupled to a collector (terminal 213) of transistor 216. An emitter (terminal 215) of transistor 216 is coupled to the common ground. A resistor 218 is coupled between a base (terminal 217) of transistor 216 and a terminal 219. As previously stated, when a data signal is not present at terminal 219 a data/idle signal (i.e., a control signal) is asserted. This causes transistor 206 to conduct. When transistor 206 conducts, a current flows through LED 202, which in turn causes light to be emitted by LED 202. In normal operation, the light emitted from LED 202 is coupled into an optical network (via an optical fiber). Thus, the data/idle signal provides a quiescent light signal that is located between an off-state and an on-state of LED 202. When a data signal is provided at terminal 219, the data/idle signal tracks the data signal. When a data signal at terminal 219 is asserted, transistor 216 conducts. This causes resistors 214 and 204 to be connected in parallel, which causes the current flow through LED 202 to increase and as a result, the light emitted from LED 202 increases.

One of ordinary skill in the art will appreciate that a tertiary driving scheme, according to the present invention, can be implemented with any light emitting device that has a characteristic curve with a substantially linear portion (that is, provided the linear region is wide enough that a receiver, utilized with the driver, can differentiate between the tertiary light levels). In general, any light emitting device that is capable of linearly delivering different detectable light intensities can be utilized. It is also contemplated that laser diodes can be utilized as the light emitting device in an optical system that utilizes a tertiary signaling scheme. For example, a transmitter that utilizes two laser diodes can provide tertiary signals. When both laser diodes are off, no light is emitted. When only one of the laser diodes is on, a quiescent light level (i.e., the data/idle signal) is provided. When both diodes are on, the light level is at a maximum. It is also contemplated that electromechanical or micromachine-type shuttering can be utilized, with devices that are only capable of emitting a single intensity light, to provide a tertiary signaling transmitter.

Figure 2B:
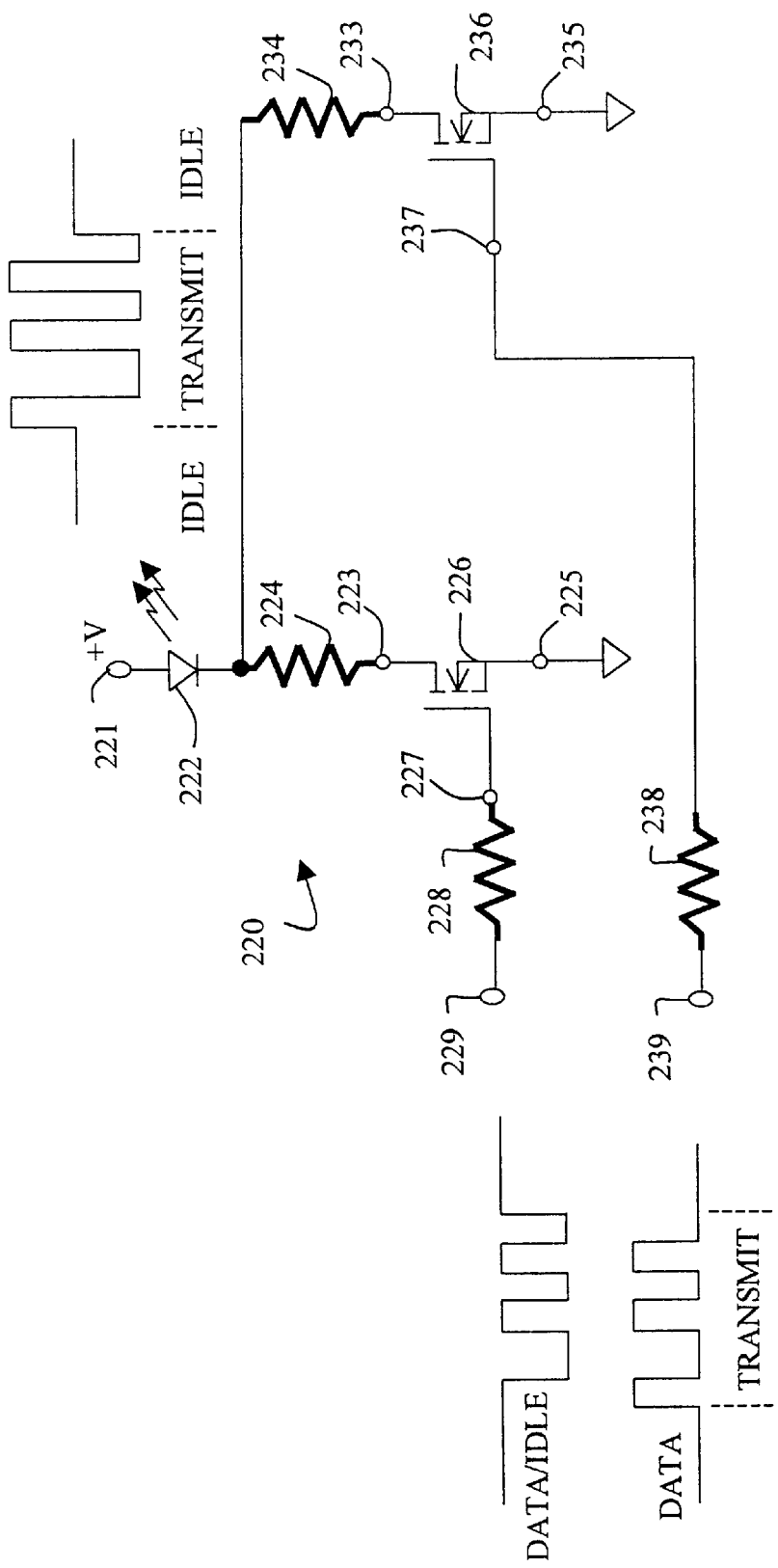

FIG. 2B is an electrical circuit schematic of a tertiary LED driver 220 that utilizes N-channel enhancement mode FETs in the place of the NPN bipolar transistors of FIG. 2A. The electrical circuit of FIG. 2B functions in essentially the same manner as the electrical circuit of FIG. 2A. That is, FETs 226 and 236 act as switches that turn on and off in response to a data/idle signal and a data signal, respectively. As such, the electrical circuit of FIG. 2B is not further discussed herein.

Figure 2C:
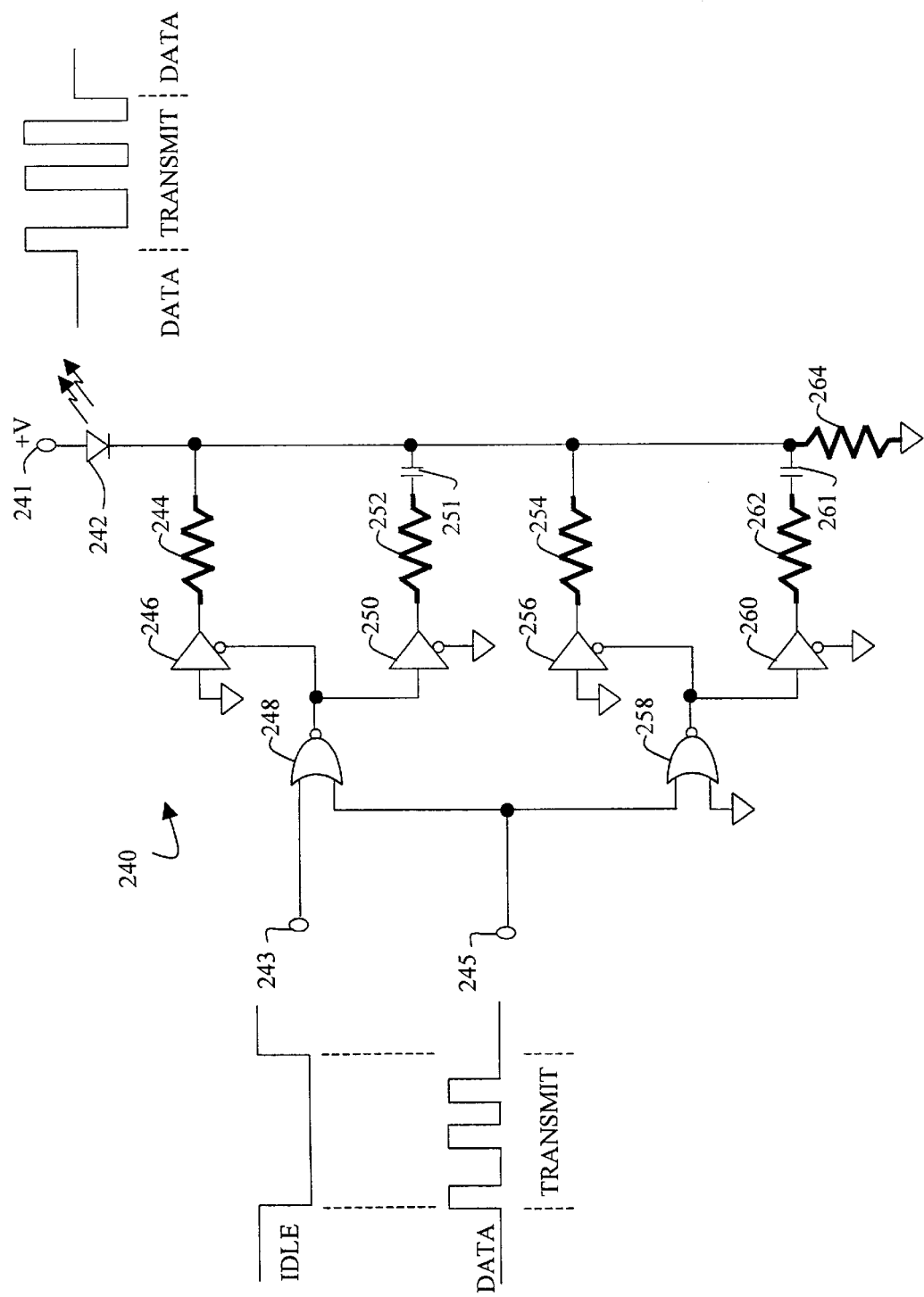

FIG. 2C is another electrical circuit schematic of a tertiary LED driver 240, according to an embodiment of the present invention. A positive terminal (+V) of a power supply is coupled to a terminal 241. A negative terminal of the power supply is coupled to a common ground of driver 240. An anode of LED 242 is coupled to terminal 241. A cathode of LED 242 is coupled to a first terminal of a resistor 244, a capacitor 251, a resistor 254, a capacitor 261 and a resistor 264. A second terminal of resistor 264 is coupled to the common ground. Resistor 264 sets a pre-bias current for LED 242. This positions LED 242 near its linear region of operation. This pre-bias current functions to partially turn on LED 242 such that an input signal applied at terminal 245 causes LED 242 to operate in a substantially linear region. A second terminal of resistor 244 is coupled to an output of a buffer 246. An input of buffer 246 is coupled to the common ground. An enable input of buffer 246 is coupled to an output of NOR gate 248.

Also coupled to the output of NOR gate 248 is an input of a buffer 250. An enable input of buffer 250 is coupled to the common ground. An output of buffer 250 is coupled to a first terminal of resistor 252. A second terminal of resistor 252 is coupled to a second terminal of capacitor 251. A first input of NOR gate 248 is coupled to a terminal 243. A second input of NOR gate 248 is coupled to a terminal 245. Terminal 245 is also coupled to a first input of NOR gate 258. A second input of NOR gate 258 is coupled to the common ground. An output of NOR gate 258 is coupled to an enable input of a buffer 256. An input of buffer 256 is coupled to the common ground. An output of buffer 256 is coupled to a second terminal of resistor 254. The output of NOR gate 258 is also coupled to an input of a buffer 260. An enable input of buffer 260 is coupled to the common ground.

An output of buffer 260 is coupled to a first terminal of resistor 262. A second terminal of resistor 262 is coupled to a second terminal of capacitor 261.

During transmitter operation, an idle signal (i.e., a control signal) is presented at terminal 243, which is normally in an asserted state. As used herein, the term "control signal" includes both a data/idle signal and an idle signal. When a data signal is present at terminal 245, the idle signal at terminal 243 changes to a deasserted state. When the idle signal at terminal 243 is asserted (i.e., high), the output of NOR gate 243 is deasserted (i.e., low). A low signal at the output of NOR gate 248 enables buffer 246 and provides a current path for LED 242 (through resistor 244 and buffer 246). The output of buffer 248 is low whenever a signal at terminal 243 or terminal 245 is high.

When the signals at terminal 243 and terminal 245 are both low, the outputs of NOR gate 248 and NOR gate 258 are high. This disables both buffers 246 and 256 which causes LED 242 to shut-off. Buffer 250, resistor 252 and capacitor 251 provide a transient current path that improves the response time of LED 241. Buffer 260, resistor 262 and capacitor 261 also provide a transient current path that improves the response time of LED 241. As with FIGS. 2A–2B; the electrical circuit of FIG. 2C provides a signal from a transmitter whose quiescent level is located between a dark level (full off) and a light level (full on).

Figure 2D:
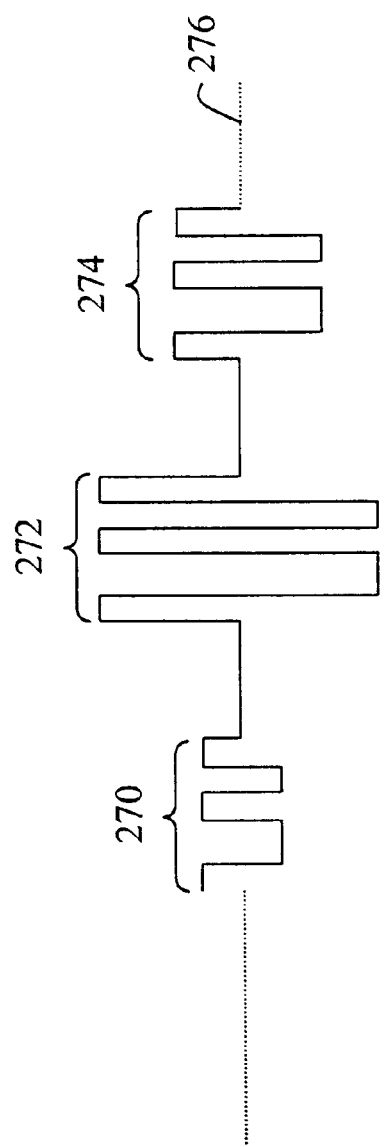
FIG. 2D is an example of signals provided by multiple transmitters (such as those of FIGS. 2A–2C) at a single receiver, according to an embodiment of the present invention.

FIG. 2D is an example of signals provided by multiple transmitters (such as those of FIGS. 2A–2C) at a single receiver, according to an embodiment of the present invention. While each transmitted signal 270, 272 and 274 has a different intensity, each signal 270, 272 and 274 has a constant centerline 276. Thus, a single receiver that receives multiple signals that have a constant centerline is not required to adaptively adjust a decision threshold. That is, the single receiver can use a constant decision threshold for multiple transmitters in determining whether a received optical signal should be converted to a digital "1" or a digital "0".

Figure 2E:
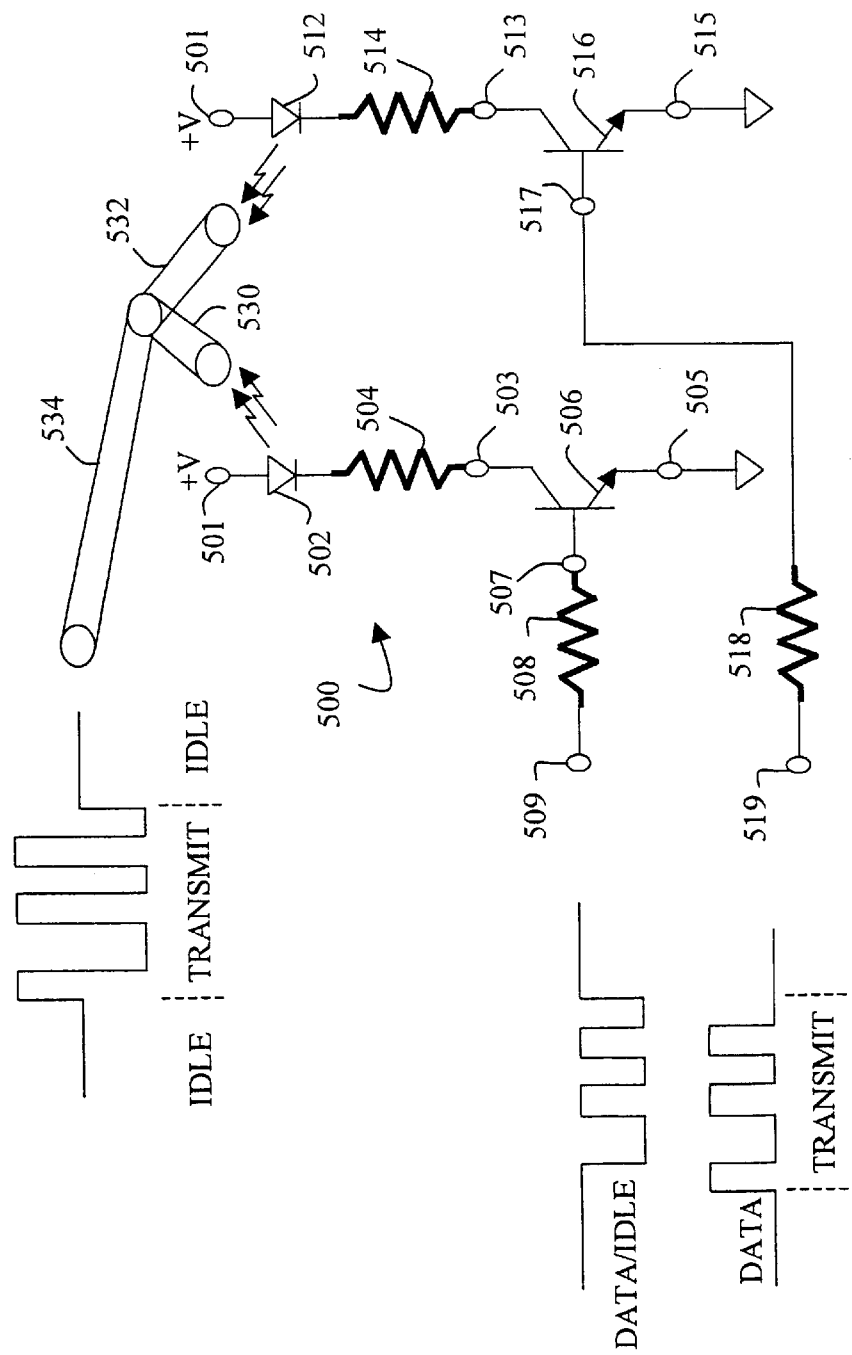
FIG. 2E is an electrical circuit diagram of a tertiary driver, according to another embodiment of the present invention.

FIG. 2E is an electrical schematic of a tertiary driver 500 that utilizes a pair of LEDs, according to an embodiment of the present invention. The anodes of LEDs 502 and 512 are coupled to a positive terminal (+V) of a power supply at a terminal 501. When transistor 506 or transistor 516 (or both) are turned on, LEDs 502 and 512 conduct current and emit light. During normal operation, a data/idle signal (i.e., a control signal) is applied to terminal 509. The data/idle signal tracks a data signal when the data signal is present and returns to an asserted state when the data signal is not present. A cathode of LED 502 is coupled to a first terminal of a resistor 504. A second terminal of resistor 504 is coupled to a collector (terminal 503) of transistor 506. An emitter (terminal 505) of transistor 506 is coupled to a common ground. A resistor 508 is coupled between a base (terminal 507) of transistor 506 and a terminal 509.

A cathode of LED 512 is coupled to a first terminal of a resistor 514. A second terminal of resistor 514 is coupled to a collector (terminal 513) of transistor 516. An emitter (terminal 515) of transistor 516 is coupled to the common ground. A resistor 518 is coupled between a base (terminal 517) of transistor 516 and a terminal 519. As previously stated, when a data signal is not present at terminal 519, the data/idle signal is asserted. This causes transistor 506 to conduct. When transistor 506 conducts, a current flows through LED 502, which in turn causes light to be emitted by LED 502. In normal operation, the light emitted from LED 502 is coupled into an optical network via optical fibers 530 and 534.

Thus, the data/idle signal provides a quiescent light signal that is located between an off-state and an on-state. When a data signal is provided at terminal 519, the data/idle signal tracks the data signal. When a data signal at terminal 519 is asserted, transistor 516 conducts. This causes light to be emitted from LED 502 and from LED 512 when the data signal is asserted. The light from LED 512 is coupled to the optical network via optical fibers 532 and 534. Optical fibers 530, 532 and 534 form an optical combiner. An end of fibers 530 and 532 is butted against an end of fiber 534. Thus, light received at the other end of fibers 530 and 532 is combined in fiber 534. One of ordinary skill in the art will appreciate that other techniques can be utilized to form an optical combiner (e.g., focusing lenses). Further, LEDs 502 and 512 can be laser diodes, if desired.

Figure 3:
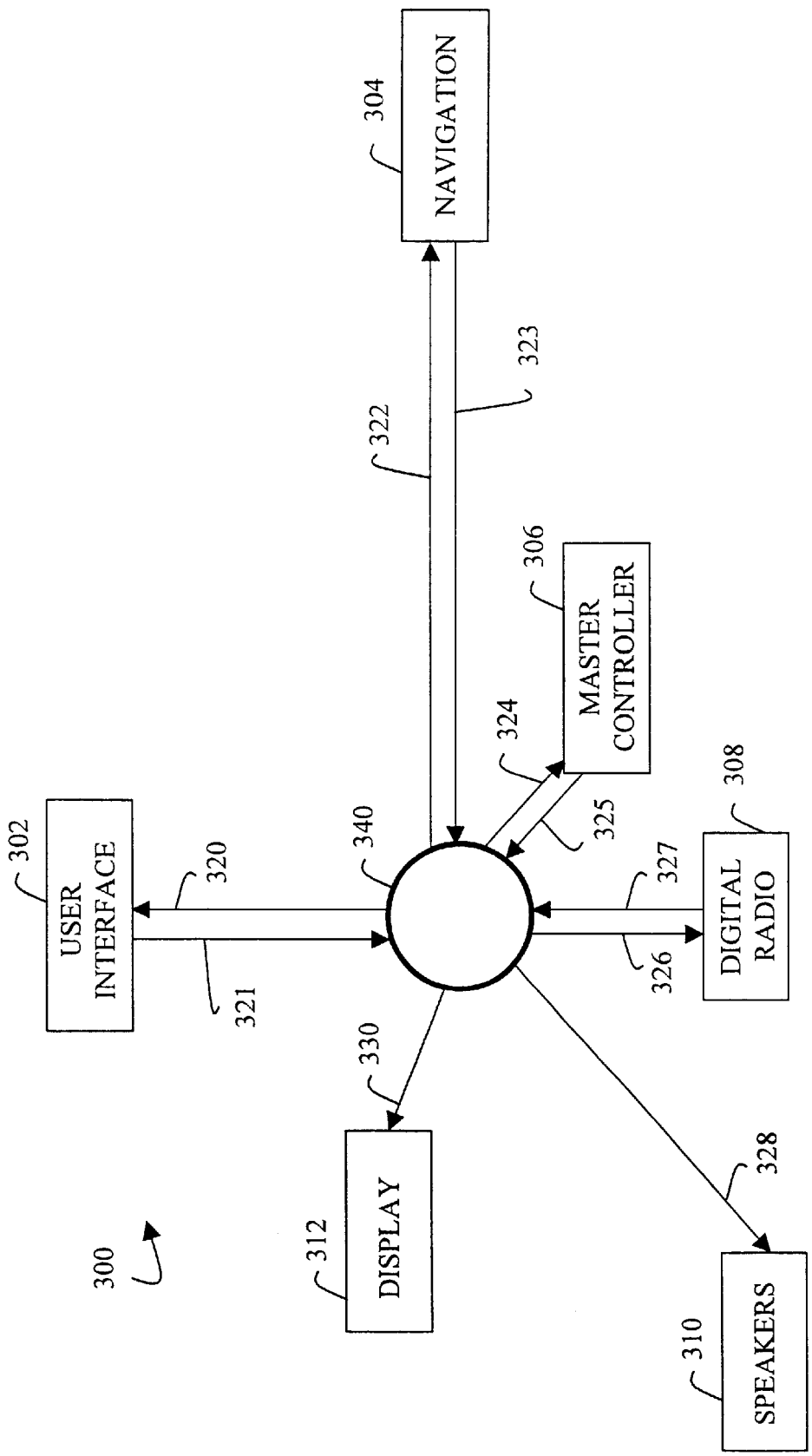
FIG. 3 is a block diagram of an optical communication network arranged in a passive star topology.

FIG. 3 is a block diagram of a passive optical star network 300 that includes various motor vehicle modules (302–312). A passive hub 340 couples various nodes together. As is well known to one of ordinary skill in the art, a passive hub is typically a flat rectangular piece of plastic with a number of transmitting fibers coupled to a first terminal and a number of receiving fibers coupled to a second terminal. As shown in FIG. 3, a user interface 302 transmits information to hub 340 via an optical fiber 321. User interface 302 receives information from optical hub 340 via an optical fiber 320. A navigation module 304 receives information from hub 340 via an optical fiber 322 and provides information to hub 340 via an optical fiber 323.

A master controller 306 provides information to hub 340 via an optical fiber 325 and receives information from hub 340 via an optical fiber 324. Preferably, master controller 306 transmits various information during an allocated time slot that allows other nodes, coupled to the network, to function correctly. This information can include configuration information and timing data (i.e., a frequency reference). The configuration information may include the data structure utilized and the time slot in which a particular node should look for data addressed to the node. Alternatively, master controller 306 can function as a central arbitrator in scheduling which node transmits in a given time slot of a given frame.

A digital radio module 308 provides information to hub 340 via an optical fiber 327 and receives information from hub 340 via an optical fiber 326. As shown, a speaker module 310 receives information from hub 340 via an optical fiber 328. A display 312 receives information from hub 340 via an optical fiber 330. While only four transmitting modules are shown in FIG. 3, one of skill in the art will appreciate that other transmitting nodes can be added, if desired. For example, U.S. Pat. No. 5,995,512 entitled "High Speed Multimedia Data Network," to Russell Wilbur Pogue, Jr., which is assigned to the assignee of the present invention, discloses a passive star network (preferably, implemented within a motor vehicle) that includes other transmitting nodes. The disclosure of U.S. Pat. No. 5,995,512 is hereby incorporated by reference.

In the passive optical star network of FIG. 3, user interface 302 could, for example, allows a user to cause a map to be displayed on display 312. This is typically accomplished when a user actuates a particular control that is coupled to user interface 302. Alternatively, the function can be voice actuated. User interface module 302 then provides certain information on optical fiber 321 during an assigned (or arbitrated) time slot. That information is provided to hub 340, which in turn provides the information to navigation module 304 (among others). Navigation module 304 receives the information via optical fiber 322. Navigation module 304 responds, if appropriate, by providing information on optical fiber 323 during an assigned (or arbitrated) time slot. Hub 340 carries the information, provided by navigation module 304, and may, for example, provide the information to display 312 via optical fiber 330. Display 312 then responds by displaying the information, for example, in the form of a road map of a particular area, as selected by a user through user interface 302.

As discussed above, master controller 306 may provide signals to each of modules 302–312 and, as such, act as a first transmitter. Navigation module 304 may also receive signals from user interface 302, which in this case acts as a second transmitter. In a typical automobile, an audio amplifier (not shown) may, for example, include a receiver which receives signals from a cellular phone (not shown, which acts as a first transmitter) and digital radio 308 (which acts as a second transmitter).

Figure 4:
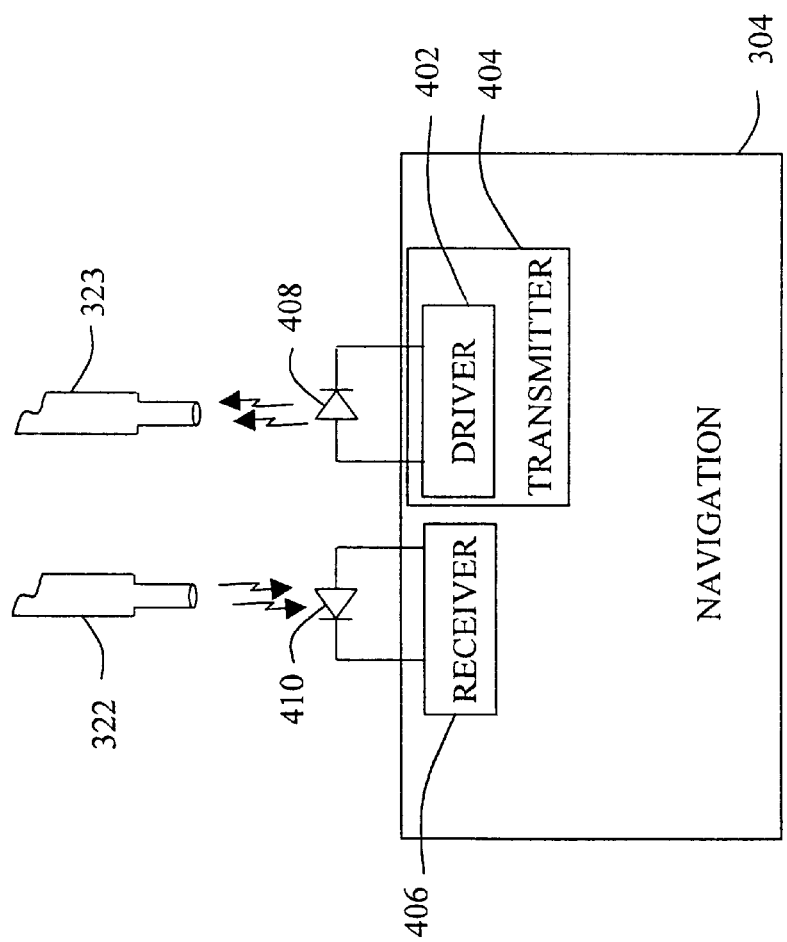
FIG. 4 is an expanded block diagram of the navigation module of FIG. 3, according to an embodiment of the present invention.

FIG. 4 is an electrical circuit and block diagram depicting a portion of navigation module 304. As previously discussed, information is transmitted to module 304 across optical fiber 322. That information is received by photodiode 410, which is coupled to a receiver 406 of navigation module 304. Typically, a microcontroller (not shown) within navigation module 304 is coupled to receiver 406 to control the processing of the received information. The microcontroller typically also controls the transmission of information (via a transmitter 404 and a driver 402) to various other nodes. As discussed in reference to FIGS. 2A–2C, driver 402 causes LED 408 to provide information (in optical form) to fiber 323. In a preferred embodiment, driver 402 of FIG. 4 is constructed according to the electrical schematic of tertiary LED driver 240 (as shown in FIG. 2C).

It is contemplated that tertiary signaling can also be advantageously implemented with active optical networks. In this case, the active circuitry in a hub or a repeater can be simplified because the received signal can be directly fed to a comparator and another tertiary LED driver without first performing an adaptive threshold function. It is also contemplated that the present invention can be advantageously implemented in an optical fiber ring that splits off a portion of the signal at each node.

In summary, a system according to an embodiment of the present invention includes a plurality of tertiary signaling transmitters for electronically transferring information across an optical superposition network that utilizes a TDM protocol. Each of the transmitters includes a light source, a first electronic device and a second electronic device that are coupled to the light source. The light source provides light to the optical superposition network. The first electronic device is coupled to the light source and receives an idle signal. The first electronic device provides a current path to the light source such that the light source emits light responsive to the idle signal. The second electronic device is also coupled to the light source and receives a data signal. The second electronic device provides another current path to the light source such that the light source also emits light responsive to a data signal. The light emitted by the light source, when the idle signal is asserted, provides an approximately constant light level such that a receiver can derive a single decision threshold from the information received from the plurality of tertiary signaling transmitters.

The above description is considered that of the preferred embodiments only. Modification of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. A method for transmitting information across an optical superposition network that utilizes a time division multiplexing (TDM) protocol, comprising the steps of:
   providing a first optical transmitter coupled to an optical fiber, the first optical transmitter transmitting information in a tertiary mode during a time slot;
   providing a second optical transmitter coupled to the optical fiber, the second optical transmitter transmitting information in a tertiary mode during a different time slot; and
   providing a receiver that is coupled to the optical fiber, wherein the information transmitted across the optical fiber by the first and second optical transmitters has an approximately constant average intensity such that the receiver can utilize a single decision threshold for both the first and second optical transmitters.

2. The method of claim 1, wherein the first and second optical transmitters are each assigned a different time slot in which to transmit information.

3. The method of claim 1, wherein the transmission of information by the first and second optical transmitters is scheduled by a central arbitrator.

4. The method of claim 1, wherein each of the first and second optical transmitters further include:
   a light source for providing light, wherein the intensity of the light is modulated to provide information to the optical fiber;
   a first electronic device coupled to the light source and receiving a control signal, the first electronic device providing a current path to the light source such that the light source emits light responsive to the control signal; and
   a second electronic device coupled to the light source and receiving a data signal, the second electronic device providing another current path to the light source such that the light source also emits light responsive to the data signal.

5. The method of claim 4, wherein the light source is a light emitting diode (LED).

6. The method of claim 4, wherein the light source is a pair of laser diodes.

7. The method of claim 1, further including the steps of:
   determining an anticipated average intensity of the information to be transmitted; and
   coding the information to be transmitted to provide a desired average intensity for the information to be transmitted.

8. The method of claim 1, wherein the optical superposition network is configured as a passive optical star network.

9. The method of claim 1, wherein the optical superposition network is configured as an active optical star network.

10. A tertiary signaling optical transmitter for transmitting information across an optical superposition network that utilizes a time division multiplexing (TDM) protocol, the tertiary signaling optical transmitter comprising:
    a light source for providing light, wherein the intensity of the light is modulated to provide information to the optical superposition network;
    a first electronic device coupled to the light source and receiving a control signal, the first electronic device providing a current path to the light source such that the light source emits light responsive to the control signal; and
    a second electronic device coupled to the light source and receiving a data signal, the second electronic device providing another current path to the light source such that the light source also emits light responsive to the data signal, wherein the light emitted by the light source provides an approximately constant average light level, and wherein the light source emits light responsive to both the control and data signals during at least a portion of an assigned time window.

11. The optical transmitter of claim 10, wherein the light source is a light emitting diode (LED).

12. The optical transmitter of claim 10, wherein the light source is a pair of laser diodes.

13. The optical transmitter of claim 10, wherein the first electronic device and the second electronic device are NPN bipolar transistors.

14. The optical transmitter of claim 10, wherein the first electronic device and the second electronic device are N-channel enhancement mode field-effect transistors (FETs).

15. The optical transmitter of claim 10, wherein the optical superposition network is configured as a passive optical star network.

16. The optical transmitter of claim 10, wherein the optical superposition network is configured as an active optical star network.

17. An optical superposition network that utilizes a time division multiplexing (TDM) protocol and tertiary signaling, comprising:
    a first optical transmitter coupled to an optical fiber, the first optical transmitter transmitting information in a tertiary mode during a time slot;
    a second optical transmitter coupled to the optical fiber, the second optical transmitter transmitting information in a tertiary mode during a different time slot; and
    a receiver coupled to the optical fiber, wherein the information transmitted across the optical fiber by the first and second optical transmitters has an approximately constant average intensity such that the receiver can utilize a single decision threshold for both the first and second optical transmitters.

18. The optical superposition network of claim 17, wherein the transmission of information by the first and second optical transmitters is scheduled by a central arbitrator.

19. The optical superposition network of claim 17, wherein the first and second optical transmitters are each assigned a different time slot in which to transmit information.

20. The optical superposition network of claim 17, wherein each of the first and second optical transmitters further include:
    a light source for providing light, wherein the intensity of the light is modulated to provide information to the optical fiber;
    a first electronic device coupled to the light source and receiving a control signal, the first electronic device providing a current path to the light source such that the light source emits light responsive to the control signal; and
    a second electronic device coupled to the light source and receiving a data signal, the second electronic device providing another current path to the light source such that the light source also emits light responsive to the data signal, wherein the light emitted by the light source provides an approximately constant average light level.

21. The optical superposition network of claim 20, wherein the light source is a light emitting diode (LED).

22. The optical superposition network of claim 20, wherein the light source is a pair of laser diodes.

23. The optical superposition network of claim 17, wherein the optical superposition network is configured as a passive optical star network.

24. The optical superposition network of claim 17, wherein the optical superposition network is configured as an active optical star network.

25. An automotive optical superposition network that utilizes a time division multiplexing (TDM) protocol and tertiary signaling, comprising:

a first optical transmitter coupled to an optical fiber, the first optical transmitter included within a first motor vehicle module, the first optical transmitter transmitting information in a tertiary mode during a time slot;

a second optical transmitter coupled to the optical fiber, the second optical transmitter included within a second motor vehicle module, the second optical transmitter transmitting information in a tertiary mode during a different time slot; and a receiver coupled to the optical fiber, wherein the information transmitted across the optical fiber by the first and second optical transmitters has an approximately constant average intensity such that the receiver can utilize a single decision threshold for both the first and second optical transmitters.

26. The network of claim 25, wherein the transmission of information by the first and second optical transmitters is scheduled by a central arbitrator.

27. The network of claim 25, wherein the first and second optical transmitters are each assigned a different time slot in which to transmit information.

28. The network of claim 25, wherein each of the first and second optical transmitters further include:

a light source for providing light, wherein the intensity of the light is modulated to provide information to the optical fiber;

a first electronic device coupled to the light source and receiving a control signal, the first electronic device providing a current path to the light source such that the light source emits light responsive to the control signal; and a second electronic device coupled to the light source and receiving a data signal, the second electronic device providing another current path to the light source such that the light source also emits light responsive to the data signal, wherein the light emitted by the light source provides an approximately constant average light level.

29. The optical superposition network of claim 28, wherein the light source is a light emitting diode (LED).

30. The optical superposition network of claim 28, wherein the light source is a pair of laser diodes.

31. The optical superposition network of claim 25, wherein the optical superposition network is configured as a passive optical star network.

32. The optical superposition network of claim 25, wherein the optical superposition network is configured as an active optical star network.

* * * * *